(12) United States Patent
Gretz

(10) Patent No.: US 7,429,025 B1
(45) Date of Patent: Sep. 30, 2008

(54) ADJUSTABLE BAR AND FIXTURE BOX ASSEMBLY

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 296 days.

(21) Appl. No.: 11/151,471

(22) Filed: Jun. 13, 2005

(51) Int. Cl.
*F16M 13/00* (2006.01)

(52) U.S. Cl. .................... 248/546; 248/201; 248/216.1; 248/214; 248/343; 248/344; 248/906; 248/200.1; 248/227.3; 248/227.4; 248/230.5; 248/231.61

(58) Field of Classification Search .............. 248/201, 248/216.1, 214, 343, 344, 546, 906, 200.1, 248/227.3, 227.4, 230.5, 231.61
See application file for complete search history.

(56) References Cited

U.S. PATENT DOCUMENTS

| | | | | |
|---|---|---|---|---|
| 4,463,923 A | * | 8/1984 | Reiker | 248/546 |
| 4,518,141 A | * | 5/1985 | Parkin | 248/546 |
| 4,538,786 A | * | 9/1985 | Manning | 248/544 |
| 4,659,051 A | * | 4/1987 | Propp et al. | 248/546 |
| 4,684,092 A | * | 8/1987 | Reiker | 248/200.1 |
| RE33,147 E | * | 1/1990 | Reiker | 248/200.1 |
| 4,909,405 A | * | 3/1990 | Kerr, Jr. | 220/3.9 |
| 5,024,412 A | * | 6/1991 | Hung et al. | 248/343 |
| 5,044,582 A | * | 9/1991 | Walters | 248/57 |
| 5,303,894 A | * | 4/1994 | Deschamps et al. | 248/343 |
| 5,720,461 A | * | 2/1998 | Kerr, Jr. | 248/317 |
| 5,824,952 A | * | 10/1998 | Bordwell et al. | 174/53 |
| 5,954,304 A | * | 9/1999 | Jorgensen | 248/200.1 |
| 6,242,696 B1 | * | 6/2001 | Reiker | 174/62 |
| 6,281,439 B1 | * | 8/2001 | Reiker | 174/62 |
| 6,303,862 B1 | * | 10/2001 | Reiker | 174/62 |
| 6,345,800 B1 | * | 2/2002 | Herst et al. | 248/342 |
| 6,595,479 B2 | * | 7/2003 | Johnson et al. | 248/343 |
| 6,720,496 B1 | * | 4/2004 | Weeks | 174/50 |
| 6,768,071 B1 | * | 7/2004 | Gretz | 200/297 |
| 6,777,615 B1 | * | 8/2004 | Gretz | 174/58 |
| 6,889,943 B2 | * | 5/2005 | Dinh et al. | 248/343 |
| 6,909,045 B2 | * | 6/2005 | Halbert | 174/50 |
| 6,965,077 B2 | * | 11/2005 | Halbert | 174/58 |
| 6,967,284 B1 | * | 11/2005 | Gretz | 174/58 |
| 7,216,838 B1 | * | 5/2007 | Gretz | 248/200.1 |

* cited by examiner

*Primary Examiner*—J. Allen Shriver
*Assistant Examiner*—Nkeisha J Dumas

(57) ABSTRACT

A hanger assembly including an adjustable bar and a fixture box for rapidly installing and centering an electrical fixture over a hole in a ceiling. The adjustable bar includes an elongated tubular member, a threaded rod rotatably connected to the tubular member, joist engaging members on each end of the bar, and a fastening arrangement for securing the fixture box with respect to the adjustable bar. The adjustable bar can be adjusted to a shortened configuration to allow easy passage through a hole in a ceiling and the tubular member then rotated to force the joist engaging members into secure contact with the joists. The fastening arrangement permits loosening and readjustment of the hanger assembly to enable centering the fixture box above the hole.

4 Claims, 7 Drawing Sheets

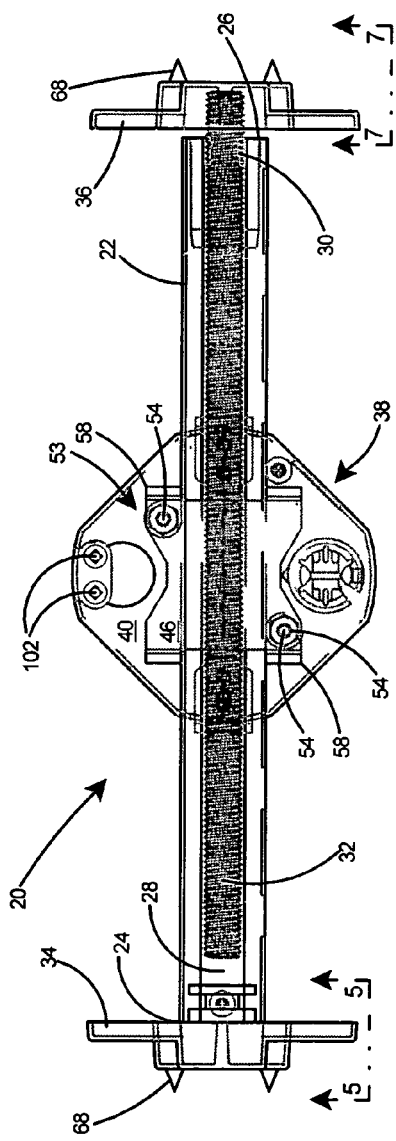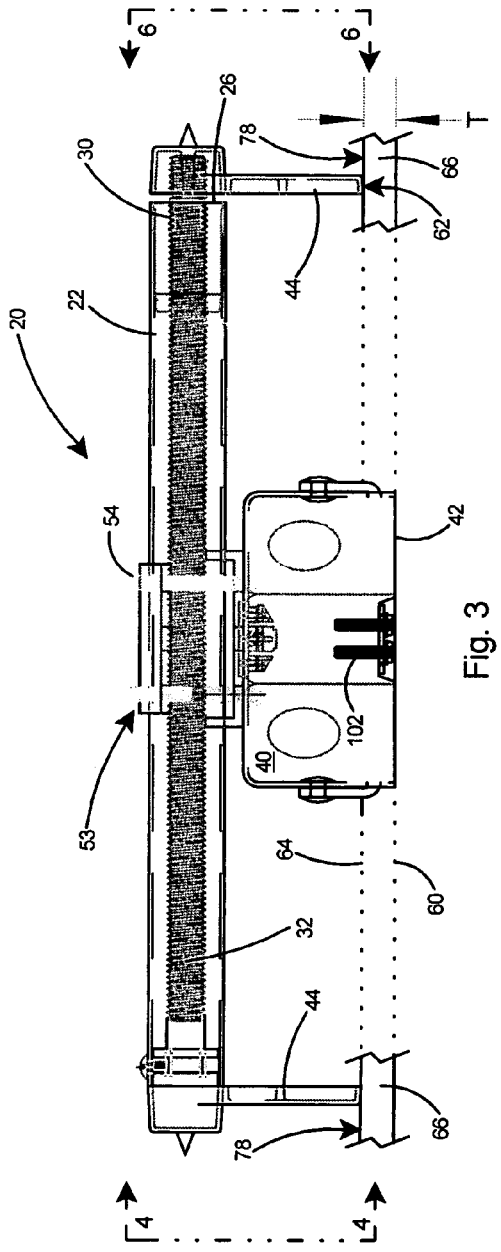
Fig. 2
Fig. 3

ADJUSTABLE BAR AND FIXTURE BOX ASSEMBLY

FIELD OF THE INVENTION

This invention relates to hangers for electrical fixtures and specifically to a hanger assembly including a fixture box that may be inserted through a hole in a ceiling to secure an electrical fixture to overhead joists and that further permits adjustments in the positioning of the fixture box to insure that it is centered above the hole.

BACKGROUND OF THE INVENTION

Electrical fixtures such as fans and lights are commonly suspended from overhead joists of buildings to provide air circulation, lighting, and similar services.

Many devices have been proposed for the suspension of electrical fixtures from ceilings. U.S. Pat. No. 4,463,923 to Reiker, for example, discloses a hanger assembly for installation from beneath a ceiling through a junction box aperture in the ceiling without complete prior removal of a previously installed light-weight hanger assembly. The hanger assembly includes an elongated linearly expanding brace means connected between two joist engaging means for expanding from a short to a longer length to bring each of the joist engaging means into pressure contact with the joists. Reiker's hanger assembly includes a junction box that is rigidly connected to the brace means for rigidly connecting the junction box with the brace assembly.

Although the hanger assembly of Reiker will adequately support an electrical fixture from overhead joists, there is no easy means for centering the junction box over the hole in the ceiling through which the hanger assembly has been installed. Readjusting the position of the junction box on Reiker's hanger assembly requires (see FIG. 3) several steps, including 1) removal of two screws (86), 2) removal of the lower box portion (88) from the upper box portion (74), 3) removal of a locking nut (82). 4) removal of the upper box portion (74), and then 5) loosening of two screws (66) which connect the lower bracket (64) to the upper bracket (62) and to the brace (42). After the screws (66) are loosened, the brackets could be slid along the brace to the correct position. However, as the junction box has been disassembled at this point and is not mounted on the brace, the installer would not be able to align the junction box with the hole in the ceiling, but would rather have to estimate the junction box's final position based upon the position of the brackets. The junction box would then need to be reattached to the brace, which would require the reversal of the above enumerated steps.

Accordingly, what is needed is a hanger assembly including a junction box that may be inserted through a hole in a ceiling to secure an electrical fixture to overhead joists and that further permits an easy adjustment of the positioning of the junction box to insure that it is centered above the hole.

SUMMARY OF THE INVENTION

The invention is a hanger assembly including an adjustable bar and a fixture box assembly for rapidly installing and centering an electrical fixture over a hole in a ceiling. The adjustable bar, which includes an elongated tubular member and a threaded rod rotatably connected thereto, can be adjusted to a shortened configuration to allow easy passage through the hole in the ceiling. The adjustable bar has joist engaging members on each end including a first joist engaging member rotatably attached to the tubular member and a second joist engaging member rigidly attached to the threaded rod. A fixture box assembly is secured to the tubular member. A pair of downward depending legs is rigidly secured to each of the joist engaging members. After being placed through the hole in the ceiling with the downward depending legs resting on the upper surface of the ceiling, the tubular member can be rotated to force the joist engaging members into secure contact with the joists. The fixture box assembly can then be easily centered above the hole by loosening of a fastening arrangement that is easily accessible from below. Retightening of the fastening arrangement secures the fixture box assembly to the tubular member and renders it ready to accept an electrical fixture thereto.

OBJECTS AND ADVANTAGES

The hanger assembly of the present invention exhibits several advantages over the prior art including:
a) A fixture box assembly that can be easily accessed from below and simply adjusted in position longitudinally along the tubular member without having to remove the fixture box assembly from the hanger assembly.
b) A fastening arrangement that may be loosened and then reconnected without causing misalignment of the fixture box assembly with respect to the tubular member.
c) A fixture box assembly that can be easily adjusted to a plurality of positions along the tubular member.
d) All the fasteners required to complete the installation of a fixture box from overhead joists are included with the hanger assembly.

These and other objects and advantages of the present invention will be better understood by reading the following description along with reference to the drawings.

DESCRIPTION OF THE DRAWINGS

FIG. 2 is a bottom view of the hanger assembly of FIG. 1.

FIG. 3 is a is a side view of the hanger assembly of FIG. 1

TABLE OF NOMENCLATURE

Figure 1:
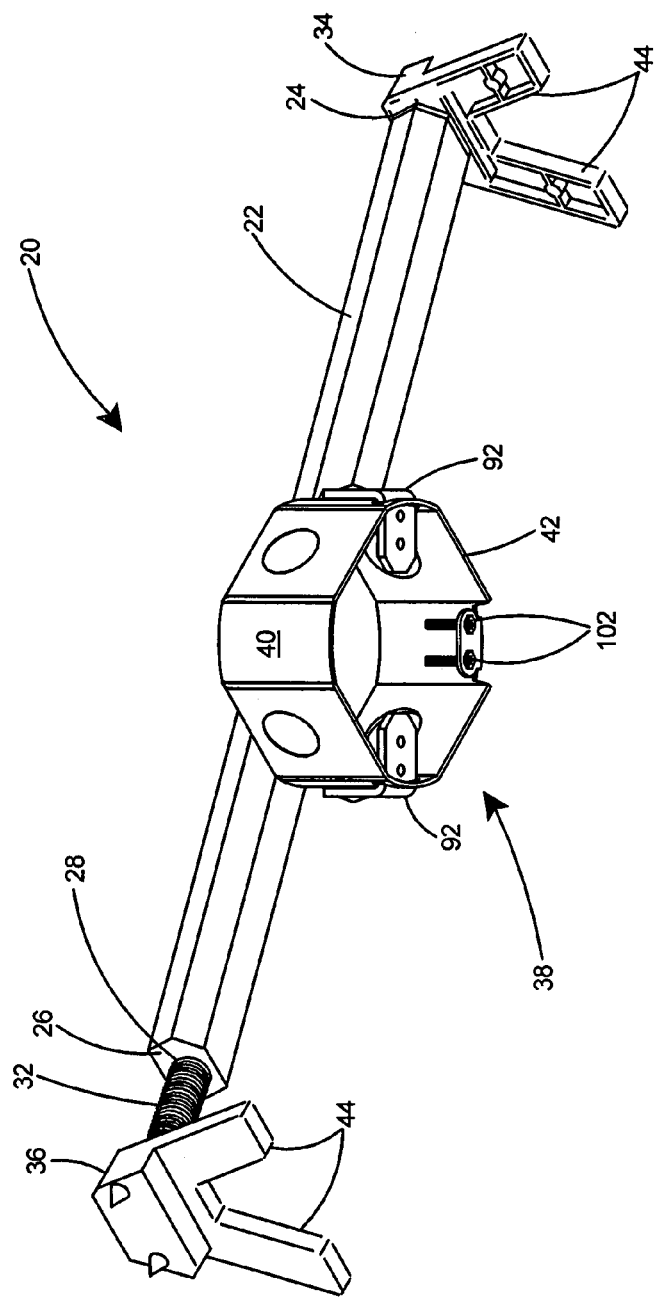
FIG. 1 has been amended to add reference numeral 28, which was referred to in the specification but mistakenly omitted in the original figure.
Figure 5:
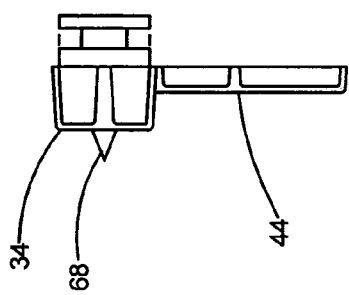
FIG. 5 is a side view of the first end of the hanger assembly taken along line 5-5 of FIG. 2.
Figure 7:
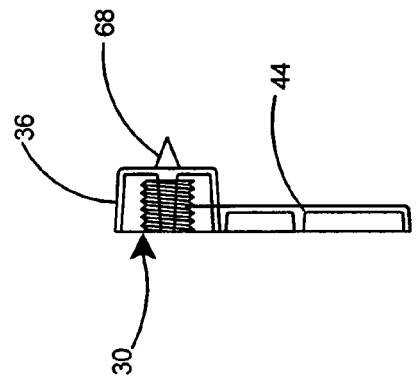
FIG. 7 is a side view of the second end of the hanger assembly taken along line 7-7 of FIG. 2.

The following is a listing of part numbers used in the drawings along with a brief description:

| Part Number | Description |
| --- | --- |
| 20 | hanger assembly |
| 22 | tubular member |
| 24 | first end of tubular member |
| 26 | second end of tubular member |
| 28 | central bore of tubular member |
| 30 | threaded bore portion |
| 32 | threaded rod |
| 34 | first joist engaging member |
| 36 | second joist engaging member |
| 38 | fixture box assembly |
| 40 | fixture box |
| 42 | lower edge of fixture box |
| 44 | pair of downward depending legs |
| 45 | two-piece bracket arrangement |
| 46 | top mounting plate |
| 48 | lower mounting plate |
| 50 | screw |
| 52 | top of fixture box |
| 53 | fastening arrangement |
| 54 | fastener |
| 56 | threaded bores in top mounting plate |
| 58 | opposing corners of top mounting plate |
| 60 | second plane |
| 62 | lower surface of downward depending leg |
| 64 | first plane |
| 66 | ceiling covering |
| 68 | outwardly extending spike |
| 70 | top portion of electrical fixture |
| 72 | joist |
| 74 | hole |
| 76 | first overhead joist |
| 78 | top surface of ceiling covering |
| 80 | second overhead joist |
| 82 | top wall of fixture box |
| 84 | sidewall of fixture box |
| 86 | corners of fixture box |
| 88 | inner cavity |
| 90 | bent over tab |
| 91 | opening in sidewall of fixture box |
| 92 | lug |
| 94 | rivet |
| 96 | large diameter knockout |
| 100 | temporary storage receptacle |
| 102 | fixture fastener |
| 104 | permanent receptacle |
| 106 | C-shaped fitting |
| 108 | large apertures in top wall of fixture box |
| 110 | small apertures in top wall of fixture box |
| T | thickness of ceiling covering |

DETAILED DESCRIPTION OF THE INVENTION

With reference to FIG. 1, a first embodiment is shown of an adjustable hanger assembly 20 according to the present invention. The adjustable hanger assembly 20 includes an elongated tubular member 22 having two ends 24 and 26 and a central bore 28, a threaded bore portion 30 in the central bore 28 at the second end 26 of the tubular member 22, a threaded rod 32 rotatably received in the threaded bore portion 30, a first joist engaging member 34 rotatably attached to the first end 24 of the tubular member 22, and a second joist engaging member 36 rigidly fastened to the threaded rod 32. A fixture box assembly 38 is secured to the tubular member 22. The fixture box assembly 38 includes a fixture box 40 with a lower edge 42. The adjustable hanger assembly 20 includes a pair of downward depending legs 44 integral with the first joist engaging member 34 and a pair of downward depending legs 44 integral with the second joist engaging member 36.

Figure 12:
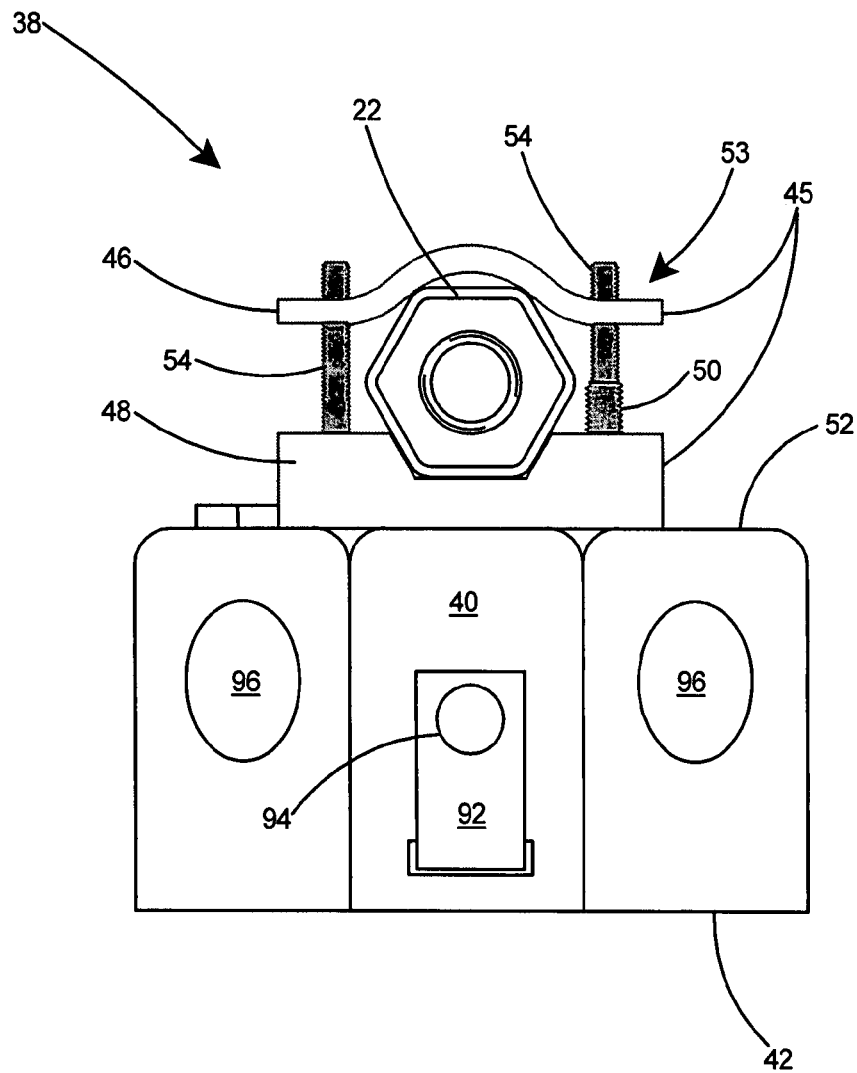
FIG. 12 has been amended to add reference numeral 52, which was referred to in the specification but mistakenly omitted in the original figure.
Figure 13:
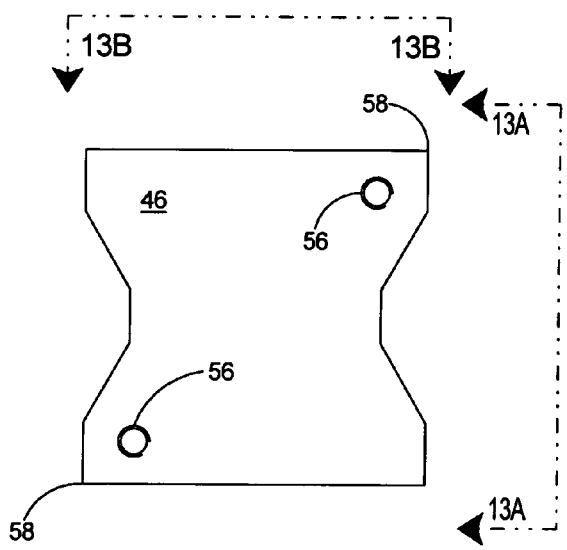
FIG. 13 is a plan view of a top mounting plate portion of the hanger assembly of FIG. 1.
Figure 13A:
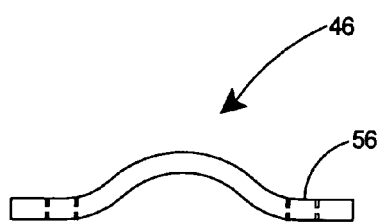
FIG. 13A is a side view of the top mounting plate taken along line 13A-13A of FIG. 13.
Figure 13B:
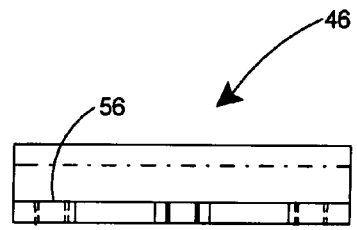
FIG. 13B is a plan view of a top mounting plate taken along line 13B-13B of FIG. 13.

Referring to FIG. 12, the fixture box assembly 38 includes a two-piece bracket arrangement 45 including a top mounting plate 46 and a lower mounting plate 48 that clamp around the tubular member 22. Screws 50, one of which is in view in FIG. 12, secure the lower mounting plate 48 to the top 52 of the fixture box 40. A fastening arrangement 53 secures the fixture box 40 to the tubular member 22. The fastening arrangement 53 includes fasteners 54 that extend from the fixture box 40 and are received in threaded bores 56 in opposing corners 58 of the top mounting plate 46 (see FIG. 13).

As shown in FIG. 2, the fasteners 54 of the fastening arrangement 53, being fastened into opposing corners 58 of the top mounting plate 46, thereby straddle the tubular member 22. The fastening arrangement 53 includes a loosened state and a tightened state. The adjustable hanger assembly 20 is typically shipped with the fasteners 54 in the tightened state, which includes the fasteners 54 tightened into the threaded bores 56 in the top mounting plate 46 and the fixture box assembly 38 secured tightly to the tubular member 22.

As shown in FIG. 12, in the tightened state, the fixture box 40 is prevented from axial rotation with respect to the tubular member 22 by the top mounting plate 46 and lower mounting plate 48 being clamped around the polygonal shaped tubular member 22. In the tightened state, the fixture box 40 is also fixed longitudinally in one position along the tubular member 22. By slightly loosening the fasteners 54 of the fastening arrangement 53, the fixture box 40 is placed in its loosened state and is rendered slideable with respect to the tubular member 22. Since screws 50 remain in place, securing the lower mounting plate 48 to the fixture box 40, and the fasteners 54 remain in place straddling the tubular member 22, the fixture box 40 can be slid along the tubular member 22 to the desired position whereupon the fasteners 54 are tightened thereby clamping the fixture box 40 to the tubular member 22.

With reference to FIG. 3, the fastening arrangement 53 in the loosened state therefore enables sliding of the fixture box 40 linearly along the tubular member 22 in such a manner that the lower edge 42 of the fixture box 40 slides along a plane 60 parallel to and at a fixed distance from the tubular member 22.

With further reference to FIG. 3, the downward depending legs 44 of the adjustable hanger assembly 20 include lower surfaces 62. The lower surfaces 62 of the legs 44, when oriented on the tubular member 22 in the same direction as the fixture box 40, intersect a first plane 64 equidistant from a second plane 60 through the lower edge 42 of the fixture box 40. The first plane 64 is offset from the second plane 60 preferably by the thickness T of the ceiling covering 66 that will be used in conjunction with the adjustable hanger assembly 20.

As shown in FIGS. 2 and 3, the adjustable hanger assembly 20 includes one or more outwardly extending spikes 68 on the first and second joist engaging members 34 and 36.

Figure 4:
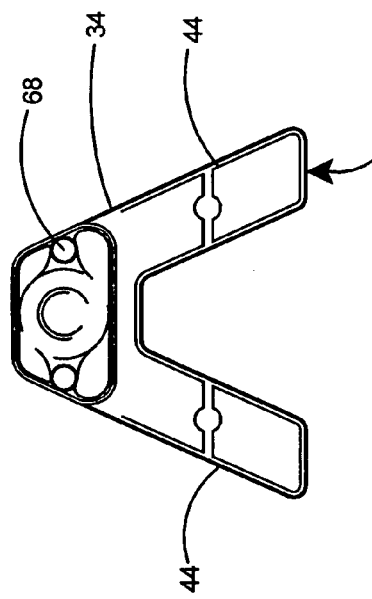
FIG. 4 is an end view of a first end of the hanger assembly taken along line 4-4 of FIG. 3.
Figure 6:
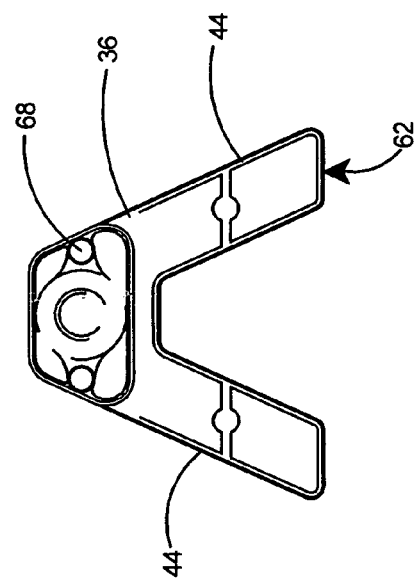
FIG. 6 is an end view of a second end of the hanger assembly taken along line 6-6 of FIG. 3.

With reference to FIGS. 3, 4, and 6, the downward depending legs 44 are substantially V-shaped when viewed from a distance beyond the first 24 and second 26 ends of the tubular member 22 (see FIG. 2).

The adjustable hanger assembly 20 is adjustable to a plurality of lengths from a fully compressed position, as shown in FIGS. 2 and 3, to a fully expanded position (not shown). With the lower surfaces 62 of the downward depending legs 44 resting on the upper surface 78 of a ceiling, a portion 66 of which is shown in FIG. 3, the tubular member 22 can be rotated to change the length of the adjustable hanger assembly 20. The length of the adjustable hanger assembly 20 at the fully compressed position is 13.37 inches and the length at the fully expanded position (not shown) is 24.5 inches. Thus the adjustable hanger assembly 20 is capable of spanning the distance between the joists of most building structures.

Figure 14:
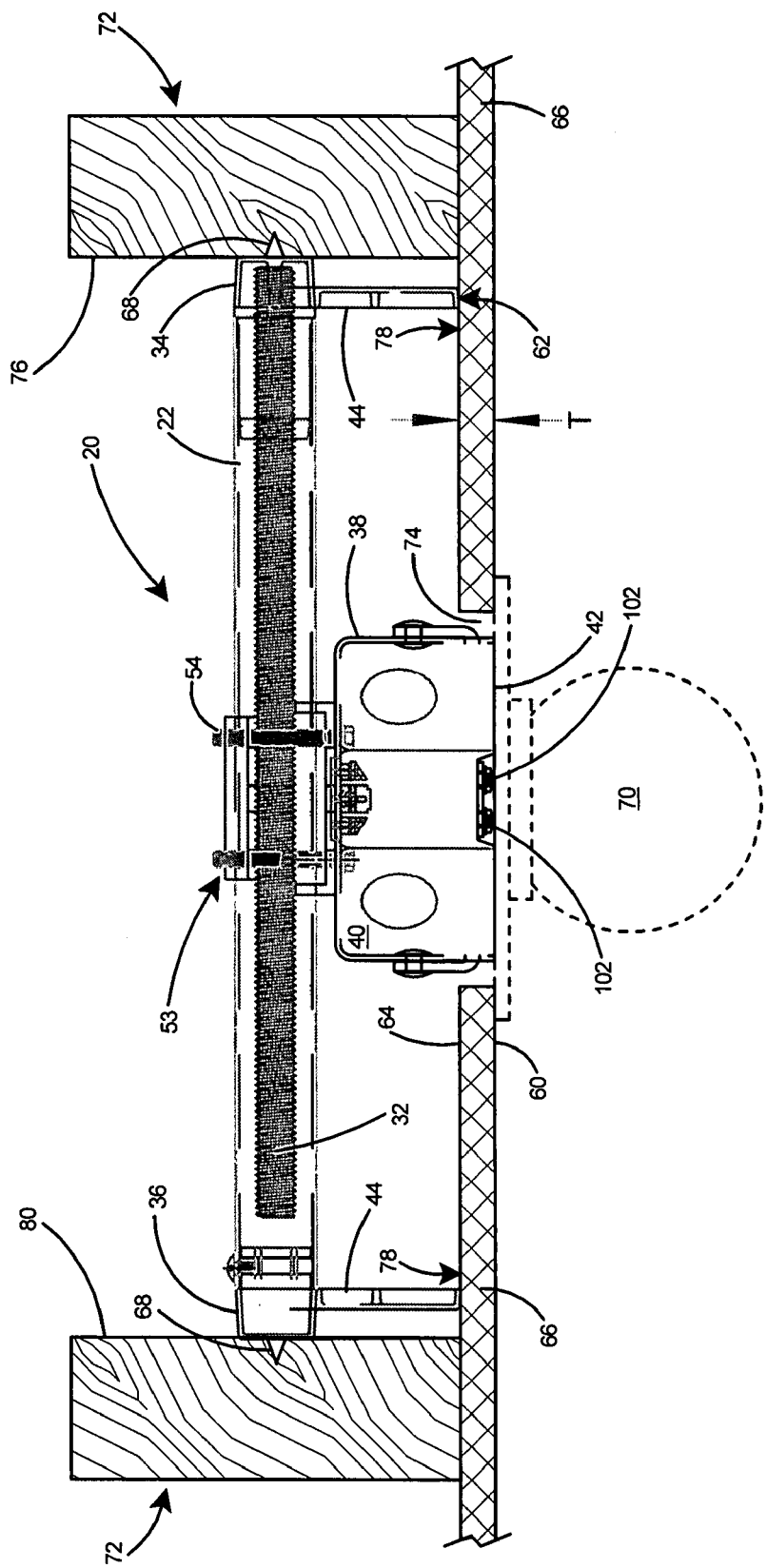
FIG. 14 has been amended to add reference numerals 34, 36, 38, 68, 72, 76, and 80, which were referred to in the specification but mistakenly omitted in the original figure.

With reference to FIG. 14, the adjustable hanger assembly 20 of the present invention is typically used to support an electrical fixture 70 (portion shown) from overhead joists 72 covered by a ceiling covering 66 through which a hole 74 has been made. The adjustable hanger assembly 20 is initially in the fully collapsed position and with the fixture box assembly 38 secured firmly to the tubular member 22. The adjustable hanger assembly 20 is placed in operation by first passing the adjustable hanger assembly 20 through the hole 74 in the ceiling covering 66. The adjustable hanger assembly 20 is placed on the ceiling covering 66 in such a manner that the first joist engaging member 34 is in contact with a first 76 of the overhead joists and the pairs of downward depending legs 44 rest upon the top surface 78 of the ceiling covering 66. The tubular member 22 is then rotated in a first direction to thereby increase the length of the adjustable hanger assembly 20. The rotation of the tubular member 22 is continued until the outwardly extending spikes 68 on the first joist engaging member 34 and the outwardly extending spikes 68 on the second joist engaging member 36 are driven completely into the overhead joists 76 and 80 and the adjustable hanger assembly 20 is firmly wedged between the overhead joists. The fastening arrangement 53 is then placed in the loosened state thereby making the fixture box 40 slideable with respect to the tubular member 22. The fixture box 40 is then slid along the tubular member 22 until the fixture box 40 is aligned above the hole 74. The fastening arrangement 53 is then converted to the tightened state to secure the fixture box 40 in a fixed position with respect to the tubular member 22.

Figure 11:
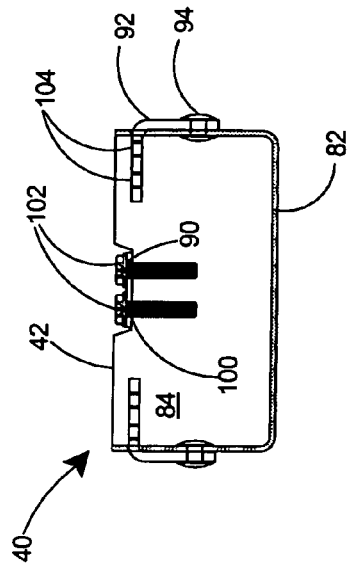
FIG. 11 is a sectional view of the fixture box taken along line 11-11 of FIG. 8.

Referring to FIGS. 8-11, a preferred embodiment of the fixture box 40 is shown. The fixture box 40 includes a top wall 82, a sidewall 84, corners 86, an inner cavity 88, a tab 90, openings 91 in the sidewall 84, and two lugs 92 on opposite corners 86 secured to the fixture box 40 by rivets 94. As shown in FIG. 11, the top wall 82 includes one or more knockout wall portions 96. The sidewall 84 of the fixture box 40 may also include knockouts 96. The lugs 92 are secured at opposite corners 86 of the fixture box 40 or 180° apart on opposite sides of the sidewall 84 in order to evenly distribute the suspended load of an installed fixture (not shown) directly under the tubular member 22 as shown in FIG. 2. The lugs 92 are right-angle shaped bars that extend through the openings 91 in the sidewall 84 of the fixture box 40 and are fastened to the sidewall 84 by rivets 94 (see FIG.

By supporting the load from the lugs 92, it is possible to construct the fixture box 40 from thinner metal such as 0.063 inch thick galvanized steel or plated steel. The lugs 92 are constructed of thicker metal, such as 0.125 inch thick galvanized steel or plated steel to withstand the stress of a supported load, which may be a fan weighing up to 35 pounds or an electrical fixture weighing up to 50 pounds. By supporting the suspended load from the lugs 92, which are typically 0.125 inch thick, the top wall 82 and sidewall 84 of the fixture box 40 may be constructed of much thinner metal, such as 0.063 inch thick steel, to lower production cost of the fixture box 40.

Figure 8:
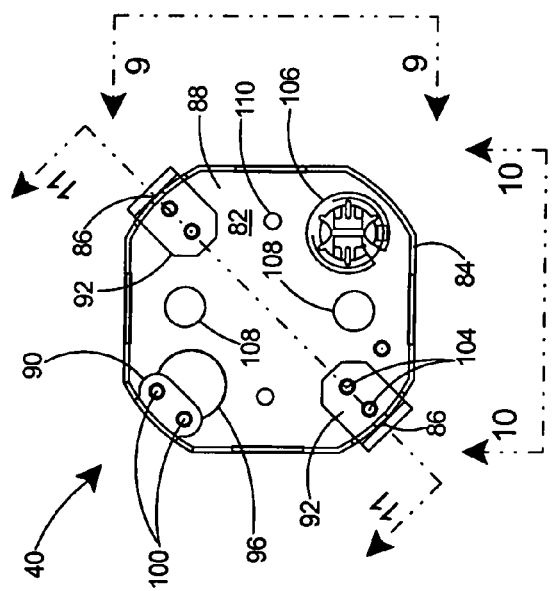
FIG. 8 is a plan view of an electrical fixture box, which forms a portion of the hanger assembly of FIG. 1.

With reference to FIGS. 8 and 11, the tab 90 is preferably a bent over portion of the sidewall 84 and offers temporary storage receptacles 100 for the fixture fasteners 102 that will be used to support the suspended load. The temporary storage receptacles 100 are threaded bores that match the threads of the fixture fasteners 102. The fixture fasteners 102 are preferably load bearing fasteners #10-32×⅞" philips/slotted combo serrated hexagon washer head screws or larger. The lugs 92 include permanent receptacles 104 to receive the fixture fasteners 102 after they are removed from the temporary storage receptacles 100 in the tab 90. The permanent receptacles 104 for the fixture fasteners 102 are on the centerline 11-11 diagonally through the fixture box 40, as shown in FIG. 8. Thus, all the fasteners that are needed to complete the installation of a ceiling fan or ceiling electrical fixture (not shown) are included integrally with the adjustable hanger assembly, which is a significant advantage to the installer who will not be forced to search for fasteners and other components at the job site. As shown in FIG. 11, the fixture fasteners 102, when "parked" in the temporary storage receptacles 100, do not extend beyond the lower edge 42 of the fixture box 40. Thus the overall profile of the adjustable hanger assembly 20 is minimized to create a compact package for easy storage and transport.

Figure 9:
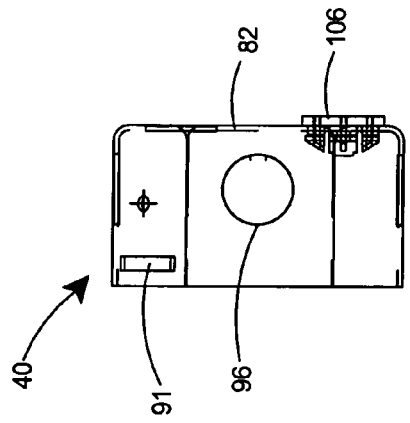
FIG. 9 is a side view of the fixture box taken along line 9-9 of FIG. 8.
Figure 10:
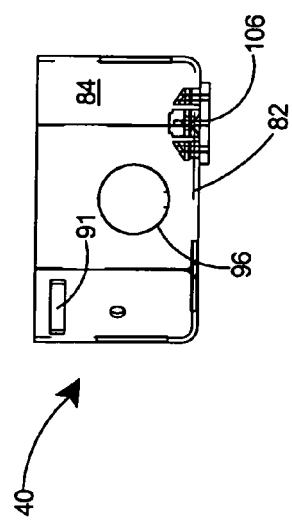
FIG. 10 is a side view of the fixture box taken along line 10-10 of FIG. 8.

With reference to FIGS. 8-10, the fixture box 40 portion of the adjustable hanger assembly my further include a C-shaped fitting 106, such as the BLACK BUTTON™ push-in connectors available from Arlington Industries, Inc., 1 Stauffer Industrial Place, Scranton, Pa. The fitting 106 could be snapped into the knockout 96 to provide a quick snap-in type fitting that provides strain relief to any non-metallic cable (not shown) later inserted therethrough.

As shown in FIG. 8, the top wall 82 of the fixture box 40 includes large apertures 108 and small apertures 110. The small apertures 110 will later accommodate the fasteners 50 that will secure the lower mounting plate 48 (see FIG. 12) to the fixture box 40. The large apertures 108 will later accommodate the fasteners 54 (see FIG. 12) that will secure the top mounting plate 46 to the lower mounting plate 48.

Having thus described the invention with reference to a preferred embodiment, it is to be understood that the invention is not so limited by the description herein but is defined as follows by the appended claims.

What is claimed is:

1. An adjustable hanger assembly for supporting an electrical fixture between two overhead joists comprising:

an elongated tubular member including a central bore and a first and a second end;

a first joist engaging member rotatably attached to said first end of said tubular member;

a threaded bore portion in said central bore at said second end of said tubular member;

a threaded rod rotatably received in said threaded bore portion;

a second joist engaging member rigidly fastened to said threaded rod;

a one-piece fixture box slideable with respect to said tubular member, said fixture box having sidewalls, a lower edge, a top wall, and an enclosure therein;

said sidewalls of said fixture box including openings therein;

lugs secured to said sidewalls and extending through said opening;

a tab extending from said sidewalls of said fixture box into said enclosure, said tab including bent over portion of said sidewalls;

temporary storage receptacles in said tabs;

fixture fasteners in said temporary storage receptacles for mounting the electrical fixture to said fixture box;

permanent receptacles in said lugs for receiving said fixture fasteners;

a fastening arrangement for securing said fixture box to said tubular member, said fastening arrangement including a loosened state and a tightened state;

said fastening arrangement including a two-piece bracket arrangement having a top plate and a lower plate;

said top plate including threaded bores therein, said threaded bores in diagonally opposed corners of said top plate and oriented diagonally with respect to one another across said tubular member;

said lower plate integral with said fixture box;

coaxial apertures in said lower plate and said fixture box;

said fastening arrangement including fasteners for securing said fixture box to said top plate;

said fasteners including heads positioned against the underside of said top wall of said fixture box and accessible from said enclosure;

said fasteners including distal ends extending through said coaxial apertures in said lower plate and said fixture box and through said threaded bores in said top plate, said fasteners in said loosened state enable sliding of said fixture box with respect to said tubular member and said fasteners in said tightened state tighten directly into said threaded bores in said top plate thereby locking said fixture box and said top plate to said tubular member;

said fastening arrangement in said tightened state including a hexagonal-shaped outer periphery on said elongated tubular bar, said hexagonal-shaped outer periphery including six flat sides and six corners;

said top plate of said fastening arrangement contacting two of said corners;

said fastening arrangement including a channel in said lower plate, said channel including a bottom and two sides; and said bottom and said sides of said channel flush with three of said flat sides of said hexagonal-shaped bar.

2. The adjustable hanger assembly of claim 1 including a pair of downward depending legs integral with said first joist engaging member; and a pair of downward depending legs integral with said second joist engaging member.

3. The adjustable hanger assembly of claim 2 wherein said downward depending legs include lower surfaces; and said lower surfaces of said legs, when oriented on said tubular member in the same direction as said fixture box, intersect a first plane equidistant from a second plane through said lower edge of said fixture box; and said first plane offset from said second plane by the thickness of a ceiling covering used in conjunction with said hanger assembly.

4. The adjustable hanger assembly of claim 1 including an outward extending top portion on said joist engaging members;

one or more outwardly extending spikes on said top portion of said joist engaging members; and a pair of downward extending legs, said downward extending legs offset inward of said top portion of said joist engaging members.

\* \* \* \* \*